(12) United States Patent
Sauer et al.

(10) Patent No.: US 9,513,931 B2
(45) Date of Patent: Dec. 6, 2016

(54) SYSTEM FOR CONTEXT BASED USER REQUESTS FOR FUNCTIONALITY

(75) Inventors: Dietmar Michael Sauer, Hoechstaedt (DE); Ilona Eirich, Mannheim (DE)

(73) Assignee: SAP SE, Walldorf (DE)

( * ) Notice: Subject to any disclaimer, the term of this patent is extended or adjusted under 35 U.S.C. 154(b) by 437 days.

(21) Appl. No.: 13/569,943

(22) Filed: Aug. 8, 2012

(65) Prior Publication Data
US 2014/0047383 A1 Feb. 13, 2014

(51) Int. Cl.
G06F 3/048 (2013.01)
G06F 9/44 (2006.01)
G06Q 10/06 (2012.01)

(52) U.S. Cl.
CPC ............. *G06F 9/4443* (2013.01); *G06Q 10/06* (2013.01)

(58) Field of Classification Search
None
See application file for complete search history.

(56) References Cited

U.S. PATENT DOCUMENTS

2007/0157115 A1* 7/2007 Peters ........................... 715/808
2013/0055138 A1* 2/2013 de Halleux ............... G06F 8/33
715/773
2013/0067373 A1* 3/2013 Weir et al. .................... 715/769

* cited by examiner

*Primary Examiner* — Matt Kim
*Assistant Examiner* — Mahelet Shiberou
(74) *Attorney, Agent, or Firm* — Jones Day

(57) ABSTRACT

Embodiments of the present invention may provide a method, machine readable storage medium, and system for context based user request for functionality. In one embodiment, software instructions may be executed by a computer processor to: provide a UI element for a software application to receive user request for functionality, initiate a context based functionality request responding to a user action on the UI element, provide UI input element(s) to receive user input for the context based functionality request, capture contextual information from the software application based on initiation of the context based functionality request, and receive submission of the context based functionality request and the captured contextual information.

20 Claims, 5 Drawing Sheets

500

SYSTEM FOR CONTEXT BASED USER REQUESTS FOR FUNCTIONALITY

BACKGROUND

Typical software applications provide a means for users to provide functionality input to a software application developer so that the developer can update or build new functionality into an application. Current software applications provide limited means for user input regarding a software application's functionality. Primarily, user input regarding functionality of a software application is limited to simply provide rating on a user interface or sending information to a software developer in the event of a software malfunction, e.g., an application crash or an error. Typically, a user recognizes a need for additional functionality during normal operation of an application (rather than during an error). Thus, neither the ratings nor submitting feedback information in the event of an error, however, provides a user the ability to address new or desired functions for a software application.

Some software applications provide a general interface for textual requests for functionality, but such interfaces are typically generic, i.e., lacking contextual information as related to the state of a software application at the point that the user inputs a request. Moreover, a user must often navigate away from a working screen of an application to provide input for such a textual request. Such generic interfaces and extraneous navigation breaks the user's contextual reference for such a functionality request. Therefore, there is a need in the art for an improved system and/or method to provide for context based user requests for functionality.

DETAILED DESCRIPTION

Figure 1:
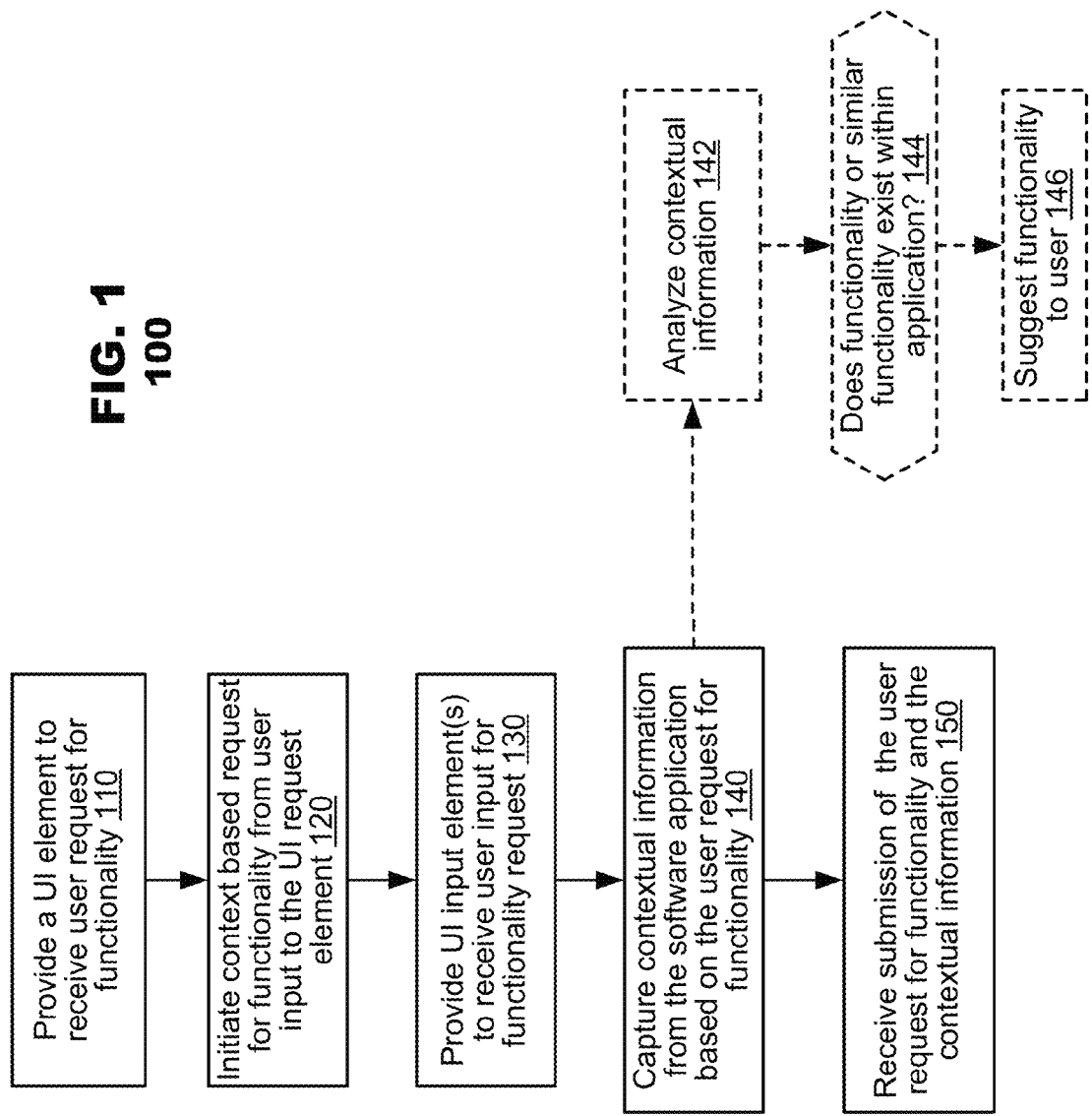
FIG. 1 illustrates a flow diagram to provide a UI for context based user requests for functionality according to an embodiment of the present invention.

Embodiments of the present invention may provide a method and system for providing a context based functionality request of a software application. The context based functionality request may be a user request submitted to one or more developer(s) of the software application to improve the software application. In various embodiments, a software application may provide user interface ("UI") elements including a "drop-down" menu, a button, or a hot-key arrangement to allow a user to initiate a context based functionality request. In various embodiments, UI elements may be provided for a user to input requests using textual inputs, guided inputs, or multiple choice inputs. The context based functionality request may "capture" contextual information of a software application at or near the time of a user's initiation of the functionality request. The contextual information may be included in the user request for functionality, which may be submitted to one or more developer(s) or system administrators of the software application. The captured contextual information may include screenshots or data corresponding to the operating state of the software application at or near the time of a user request for functionality.

In one embodiment, the software application may have one or more tools implemented to analyze a user request for functionality to determine if software the functionality currently exists or is similar to the requested functionality. If such functionality does exist, the tools may suggest the functionality to the user.

Embodiments of the present invention may provide UI elements in a software application to allow a user to provide feedback about what the user would have wished to happen at any situation. This feedback (e.g., a functionality request) and the context information of the current situation (e.g. name of the current screen, name of the previous screen, selected elements on the screen, displayed data, etc.) may be used to improve the software product on non-existing functionality. The feedback may also be used to improve usability of current functionalities. For example, a user may provide a feedback about certain functionality that the user would expect at a special point in the software application. This functionality might already exist in the software product but cannot be found by the user or is expected at another position in the software application. In various embodiments, the software application according to the present invention may be a desktop software application or a web-based software application (e.g., accessed via a web browser).

By providing UI elements on user interfaces for user to send functionality request(s), ideas on missing functionality and features close to the context of existing data and functionality may be generated and used to create new functions and features. Additionally scenario gaps may be identified and closed. In an embodiment, the UI elements for functionality request may be enabled (e.g., displayed or implemented) during specific phases of the software lifecycle (e.g. test phase). In another embodiment, the user of the software application may be allowed to switch on/off of the UI elements for functionality request.

Figure 2:
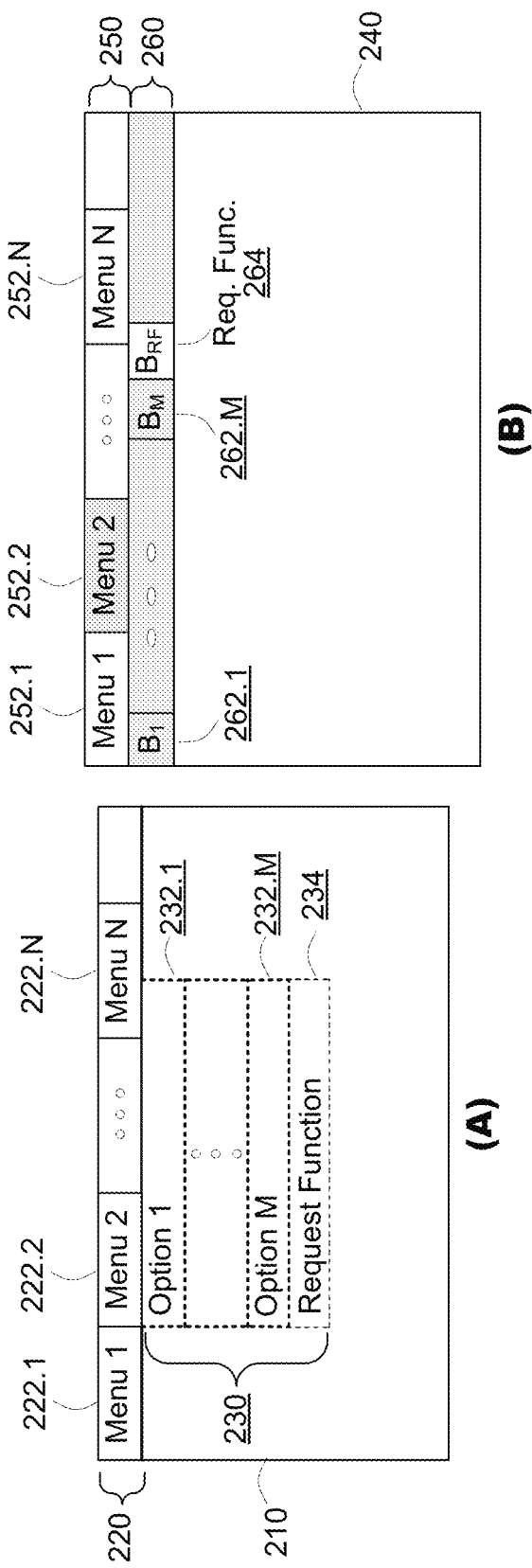
FIG. 2 illustrates exemplary UI elements for initiating context based users requests for functionality according to an embodiment of the present invention.

FIG. 1 illustrates a method 100 to provide context based user requests for functionality according to an embodiment of the present invention. The method 100 may start at block 110, in which a UI element to receive user request for functionality may be provided. A software application according to the present invention may provide one or more UI elements on the UI of the software application to receive user feedback about functionality requests. For example, FIG. 2 illustrates a UI interface 200 with exemplary UI elements for initiating context based users requests for functionality according to an embodiment of the present invention.

As shown in FIG. 2(A), a UI 210 may comprise a top level menu bar 220. The top level menu bar 220 may comprise a plurality of top menus 222.1 through 222.N (N being an integer larger than one). Each top level menu 222 may have a plurality of drop down menu items 232.1 through 232.M (M being an integer larger than one, M may or may not equal to N). One of the top menus, e.g., menu 222.2, may include a Request Function menu item 234 in addition to its functional menu items 232.1~232.M. In an embodiment, the drop down menu items and the Request Function menu item 234 may be displayed by moving a cursor over a respective menu (e.g., menu 222.2). The Request Function menu item 234 may be a link, a button or any UI element that can accept a user click (or enter the enter key when it has the focus) to initiate software code responding to the user click. In another embodiment, the drop down menu items 232.1~232.M and the Request Function menu item 234 may be displayed by clicking a cursor on the respective menu. In some embodiments, the Request Function menu item 234 may be included in the drop down list of every menu (e.g., each of menus 222.1 through 222.N). In some other embodiments, the Request Function menu item 234 may be included in the drop down list of certain menu(s) (e.g., menu 222.2 and/or other menus).

FIG. 2(B) shows the UI 200 in another embodiment. As shown in FIG. 2(B), a UI 240 may comprise a top level menu bar 250. The top level menu bar 250 may comprise a plurality of top menus 252.1 through 252.N. Underneath the top level menu bar 250, the UI 240 may further comprise a secondary menu bar 260, which may comprise a plurality of secondary menu items 262.1 through 262.M and a Request Function menu item 264. The Request Function menu item 264 may be a link, a button or any UI element that can accept a user click (or enter the enter key when it has the focus) to initiate software code responding to the user click.

Referring back to FIG. 1, the method 100 may continue to block 120 from the block 110, in which a functionality request from a user may be initiated by accepting user input to the UI element for function request. For example, a user may click on the Request Function menu item 234 or the Request Function menu item 264 to initiate context based request for functionality.

Figure 3:
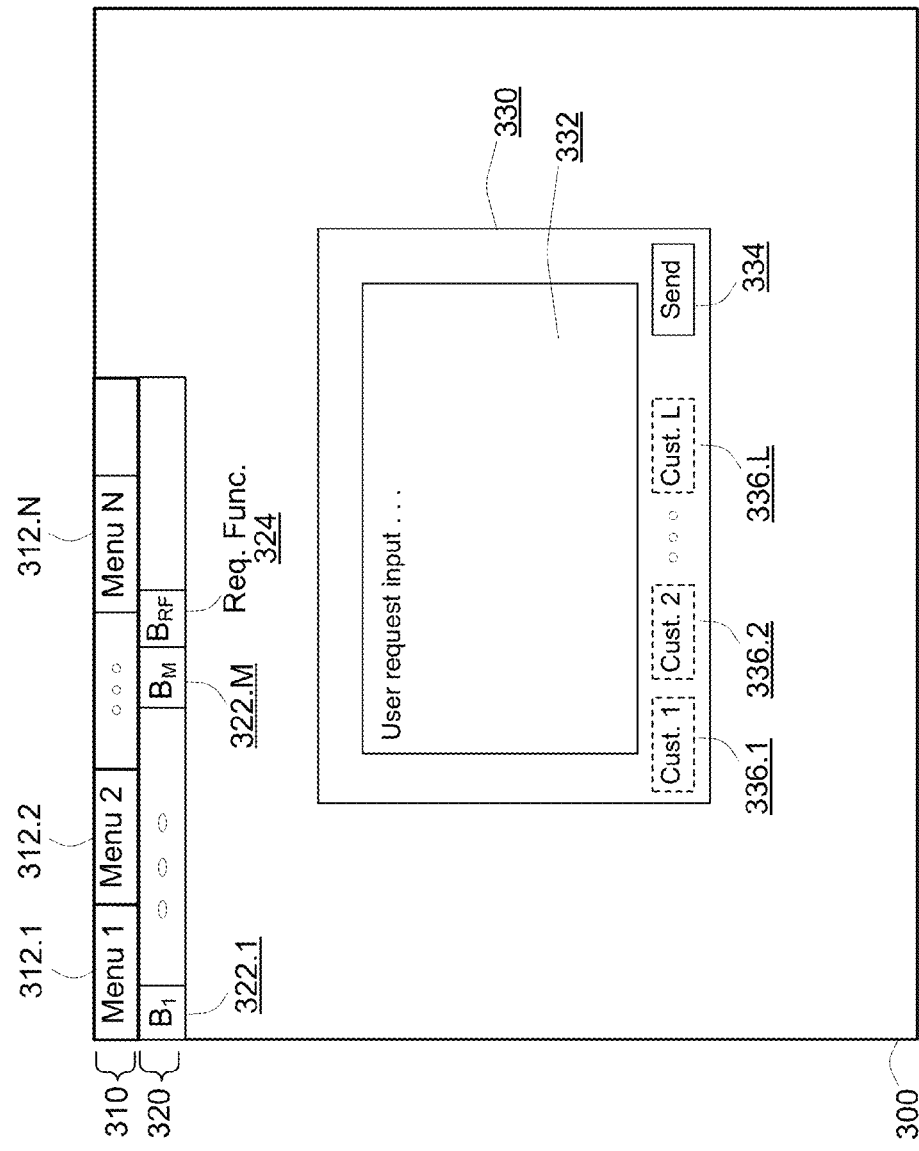
FIGS. 3-4 illustrate exemplary user interfaces with input elements to receive user inputs for functionality requests according to an embodiment of the present invention.
Figure 4:
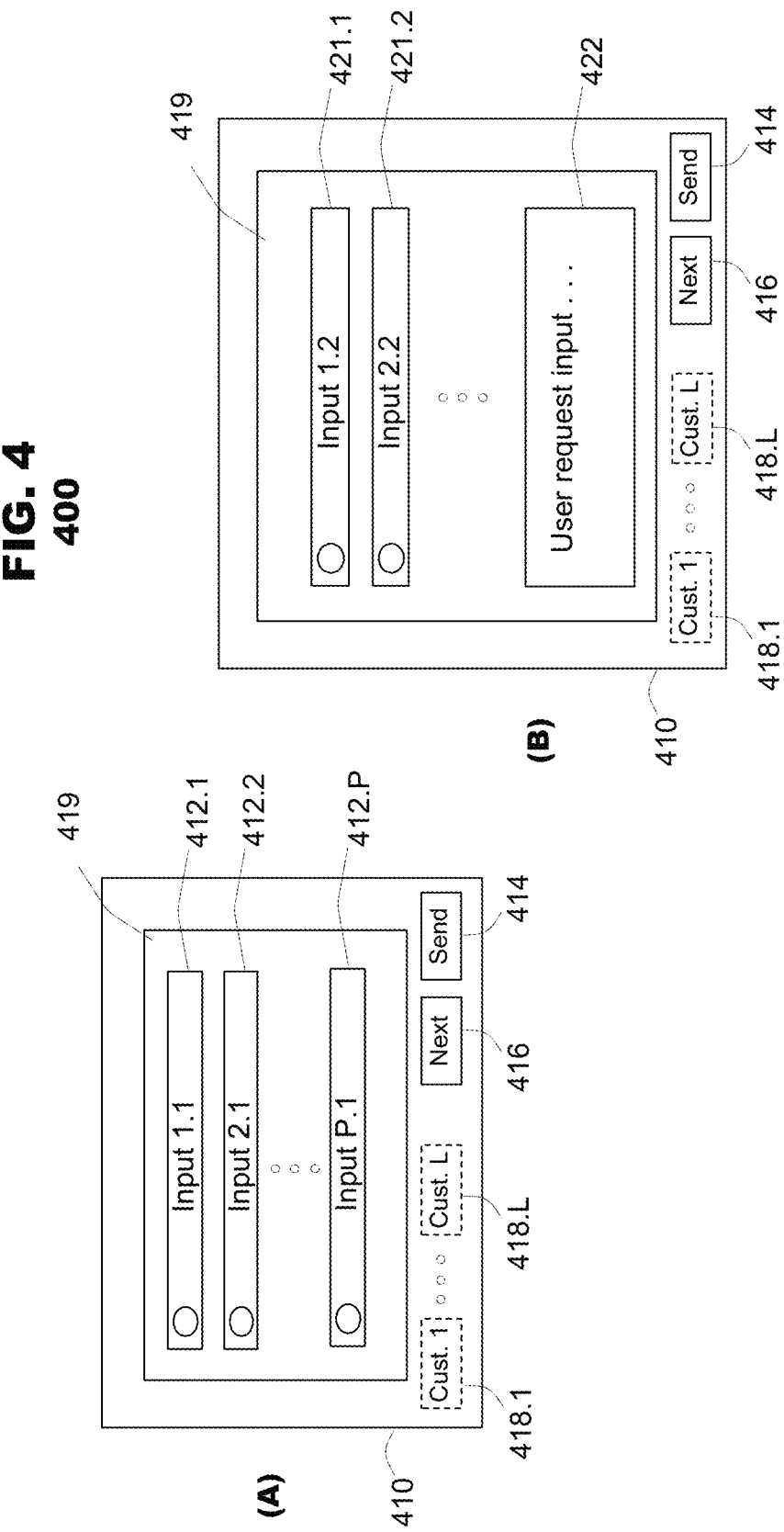

Then, the method 100 may continue to block 130. At block 130, one or more UI input elements to receive user input for a functionality request may be provided. For example, FIGS. 3-4 illustrate exemplary user interfaces with input elements to receive inputs for requests for functionality according to an embodiment of the present invention. As shown in FIG. 3, a UI 300 may comprise a top level menu bar 310 that may include a plurality of menu items 312.1 through 312.N. The UI 311 may further comprise a secondary menu bar 320 that contains a plurality of secondary menu items 322.1 through 322.M and a Request Function UI element 324. The UI 300 may further include a user input screen 330 to receive user input related to the functionality request. The use input screen 330 may be displayed upon a user moving a cursor over the Request Function UI element 324 or a click on the Request Function UI element 324 (or pressing the "enter" key when the UI element 324 has focus). The user input screen 330 may include a text input box 332 and a plurality of customization buttons 336.1 through 336.L (L being an integer larger than one, L may or may not equal to M or N) and a send button 334 (these buttons may be links in HTML for a web based application or conventional desktop application buttons). Each of the customization buttons 336.1 through 336.L may provide a different aspect of user input for the functionality request. That is, the user may click 336.1 to enter some user input for one aspect of the functionality request (e.g., new UI element, new functionality, etc.), then click 336.2 to enter some other user input for a different aspect of the functionality request (e.g., color, type of UI element, etc.).

FIG. 4 shows a UI 400 that demonstrates another embodiment of the user input screen 330. FIG. 4(A) illustrates a UI 410 that includes a plurality of customization buttons 418.1 through 418.L, a "next" button 416, a "send" button 414 and an input area 419. The input area 419 may include a plurality of options buttons (e.g., radio buttons or check buttons) 412.1 through 412.P (P being an integer larger than one, P may or may not equal to L, M, and/or N). The input area 419 may be used to show different UI elements corresponding to each customization buttons 418.1 through 418.L. In the current view of FIG. 4(A), the input area 419 may display the UI elements corresponding to the customization button 418.1. FIG. 4(B) may illustrate the input area 419 showing UI elements corresponding to the customization button 418.2. The input area 419 of FIG. 4(B) may include options 421.1 and 421.2 and other options (not shown), and a text box 422 for a user to enter textual information about the functionality request. All other elements of the FIG. 4(B) may be the same as FIG. 4(A).

In an embodiment, the "next" button 416 may be used to add new customization input elements. For example, there may be a predefined L minus one (L-1) customization buttons that each may cover a different aspect of a functionality request. A user may click "next" to add the L-th customization button and the L-th input area elements (e.g., buttons for some predetermined options, text boxes, etc.). The input area options may include, for example, mandatory or optional, black or white, or other suitable options.

The "send" button 414 may be used to submit the user functionality request upon completion. That is, the user may click the "send" button 414 after finishing inputting all aspects of the functionality request to submit the functionality request (e.g., to a software vendor, or a system administrator for the software application).

Referring back to FIG. 1, upon receipt of user input about the functionality request (e.g., from the UI elements such as those in FIGS. 3-4), the method 100 may continue to block 140. At block 140, the method 100 may capture contextual information from the software application based on the user request for functionality 140. For example, contextual information related to the state of the software application at the point that the user initiates the functionality request may be collected. The contextual information may include, for example, name of the current screen of the software application, name of the previous screen, selected elements on the screen, displayed data, etc.

As shown in FIG. 1, the method 100 may include optional blocks 142, 144 and 146 from the block 140. At block 142, the method 100 may analyze the captured contextual information. At block 144, the method 100 may determine whether functionality or similar functionality exists with the software application already. For example, the user may not be aware of the existence of the requested functionality or similar functionality. At block 146, the existing functionality or existing similar functionality may be recommended to the user.

From the block 140, the method 100 may continue to block 150, in which the method 100 may receive submission of the user request for functionality and the contextual information. As mentioned above, the "send" button shown in FIGS. 3-4 may be used by a user to submit the functionality request. In an embodiment, the captured contextual information may be submit with the functionality request along with the user inputs. The captured contextual information and the functionality request may be communicated to one or more developers or system administrators for further evaluation or implementation.

Figure 5:
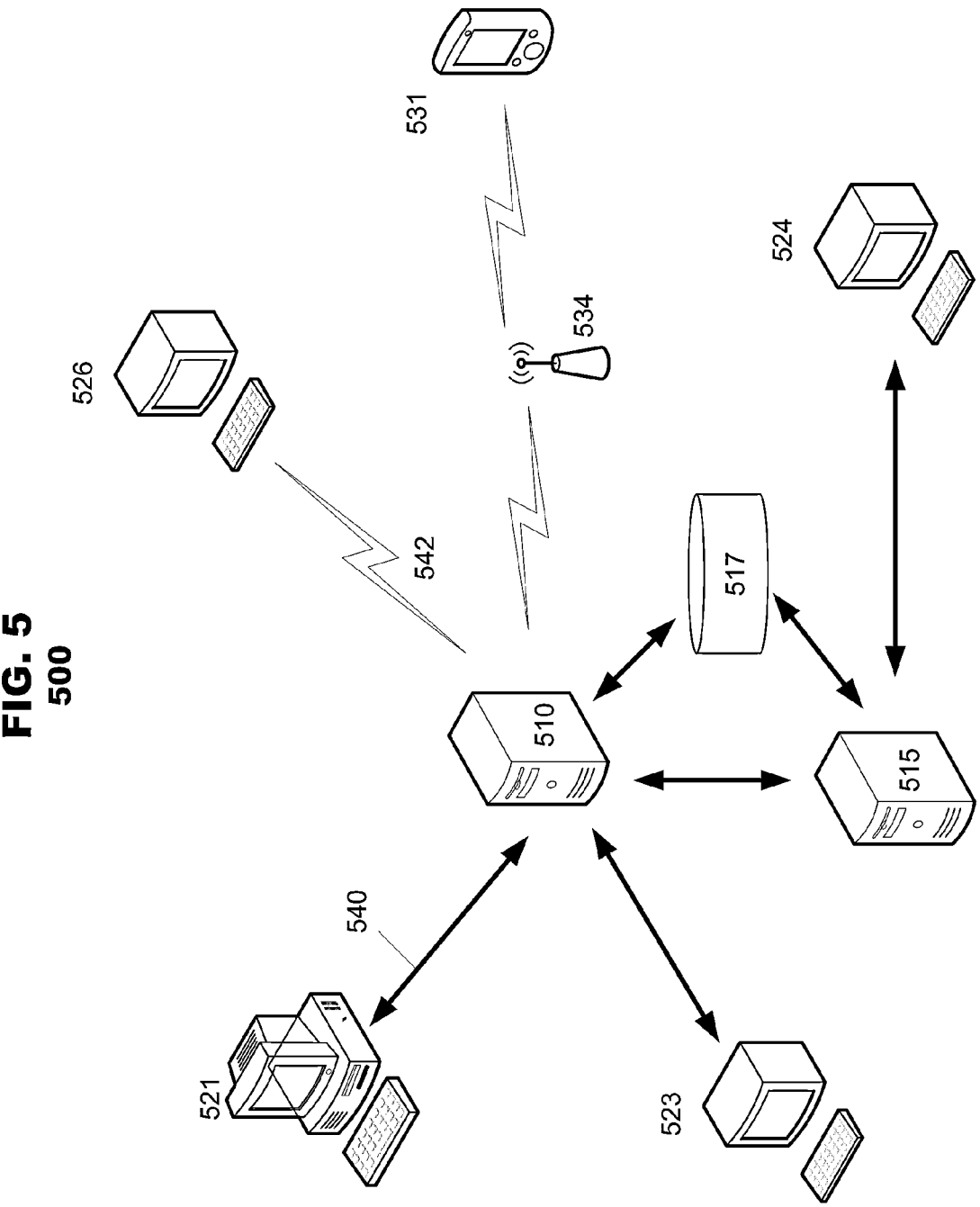
FIG. 5 illustrates a hardware configuration for implementing a system according to an embodiment of the present invention.

FIG. 5 illustrates an exemplary hardware configuration for implementing a system 500 according to an embodiment of the present invention. The system 500 may comprise one or more networked servers 510 and 515, one or more client terminals 521, 523, 524 and 526, data storage devices 517, wired and wireless communication links 540 and 542, wireless access point 534, and a portable device(s) 531. The one or more networked servers 510 and 515 may execute a software application to provide a user interface on the one or more client terminals 521, 523, 524 and 526, and on the portable device(s) 531. The servers 510 and 515 may include processor(s), internal memory and related computer program instructions (all not shown).

The server 510 and/or 515 may execute on computer processors that facilitates provision of a context based functionality request and transfers the functionality request (along with contextual information and user inputs) between the networked servers 510 and 515, and the client terminals 521, 523, 524 and 526, and/or portable device(s) 531 over wired or wireless communication paths. The server 510 may access data storage device(s) 517 that store machine-readable software instructions that may be accessed and executed by the processor(s) of the server 510.

The data storage device(s) 517 also may store data related to the operation of the software application. The data storage device 517 that may be a hard disk drive, non-volatile memory, flash memory, or any suitable device for storing electronic data, and may be organized as a object-oriented or relational database. The data storage may maintain hierarchical data structures containing information related to a variety of different business functions of an enterprise. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The servers 510 and 515 may communicate with client terminal(s) 521, 523, 524, 526 and portable device(s) 531 via network connections 540 and 542. The client terminals 521, 523, 524 and 526 may include a processor, display device, and data storage device, such as a hard disk (all not shown). The client terminals 521, 523, 524 and 526 may participate in execution of program instructions for business applications and/or business application UIs. The portable device 531 may be a smartphone, personal digital assistant, tablet, notebook or mini-notebook computer capable of wired and/or wireless communication. The portable device 531 may include memory, a processor, input device, display, and devices that enable wired or wireless communication.

The number of servers, number of clients and topology of the network connections between them are immaterial to the present discussion unless otherwise noted. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium may include electronic circuits, semiconductor memory device, ROM, flash memory, erasable ROM (EROM), floppy diskette, CD-ROM, optical disk, hard disk, fiber optic medium, any electromagnetic storage device, or optical. The code segments may be downloaded via computer networks such as Internet, Intranet, etc. The disclosed embodiments may be used in a semantic business application solution to support context-related search in SAP business applications (e.g., SAP ERP, SAP CRM, etc.) and/or non-SAP systems. The business knowledge provided by a semantic network can be used by all business applications, e.g. as a semantic extension.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

We claim:

1. Computer system, comprising:
 a memory to store computer instructions; and
 a processor coupled to the memory to execute the computer instructions to:
  provide a UI element for a software application, on each of a plurality of displays rendered in a graphical user interface of the software application, to receive user request for functionality indicating a limitation of the software application;
  initiate a context based functionality request responding to a user action on the UI element in the graphical user interface;
  provide UI input element(s) in the graphical user interface to receive user input for the context based functionality request;
  capture contextual information from the software application based on initiation of the context based functionality request, the contextual information including a current display within the plurality of displays, a previous display within the plurality of displays, and data relating to the UI element; and
  receive submission of the context based functionality request and the captured contextual information.

2. The computer system of claim 1, wherein the captured contextual information relates to a state of the software application at a point that the user initiates the functionality request.

3. The computer system of claim 1, wherein capturing the contextual information from the software application includes analyzing the functionality request to determine whether the requested functionality or a functionality similar to the requested functionality exists within the software application.

4. The computer system of claim 3, further comprising suggesting the existing functionality to the user if the requested functionality or a similar functionality exists within the software application.

5. The computer system of claim 1, wherein the UI input element(s) to receive user input for the context based functionality request include a UI element to submit the context based functionality request.

6. The computer system of claim 1, wherein the UI input element(s) to receive user input for a context based functionality request include a plurality of UI screens to receive user input for different aspects of the context based functionality request.

7. A method for implementation by one or more data processors forming part of at least one computing system, the method comprising:
providing, by at least one data processor, a UI element for a software application, on each of a plurality of displays rendered in a graphical user interface of the software application, to receive user request for functionality;
initiating, by at least one data processor, a context based functionality request responding to a user action in the graphical user interface on the UI element;
providing, by at least one data processor, UI input element(s) to receive user input in the graphical user interface for the context based functionality request;
capturing, by at least one data processor, contextual information from the software application based on initiation of the context based functionality request, the contextual information including a current display within the plurality of displays, a previous display within the plurality of displays, and data relating to the UI element; and
receiving, by at least one data processor, submission of the context based functionality request and the captured contextual information.

8. The method of claim 7, wherein the captured contextual information relates to a state of the software application at a point that the user initiates the functionality request.

9. The method of claim 7, wherein capturing the contextual information from the software application includes analyzing the functionality request to determine whether the requested functionality or a functionality similar to the requested functionality exists within the software application.

10. The method of claim 9, further comprising suggesting the existing functionality to the user if the requested functionality or a similar functionality exists within the software application.

11. The method of claim 7, wherein the UI input element(s) to receive user input for the context based functionality request include a UI element to submit the context based functionality request.

12. The method of claim 7, wherein the UI input element(s) to receive user input for the context based functionality request include a plurality of UI screens to receive user input for different aspects of the contest based functionality request.

13. A non-transitory computer readable medium storing a program causing a computer to execute a method, the method comprising:
providing a UI element for a software application, on each of a plurality of displays rendered in a graphical user interface of the software application, to receive user request for functionality;
initiating a context based functionality request responding to a user action on the UI element in the graphical user interface;
providing UI input element(s) to receive user input for the context based functionality request in the graphical user interface;
capturing contextual information from the software application based on initiation of the context based functionality request, the contextual information including a current display within the plurality of displays, a previous display within the plurality of displays, and data relating to the UI element; and
receiving submission of the context based functionality request and the captured contextual information.

14. The non-transitory computer readable medium of claim 13, wherein the captured contextual information relates to a state of the software application at a point that the user initiates the functionality request.

15. The non-transitory computer readable medium of claim 13, wherein capturing the contextual information from the software application includes analyzing the functionality request to determine whether the requested functionality or a functionality similar to the requested functionality exists within the software application.

16. The non-transitory computer readable medium of claim 15, further comprising suggesting the existing functionality to the user if the requested functionality or a similar functionality exists within the software application.

17. The non-transitory computer readable medium of claim 13, wherein the UI input element(s) to receive user input for the context based functionality request include a UI element to submit the context based functionality request.

18. The non-transitory computer readable medium of claim 13, wherein the UI input element(s) to receive user input for the context based functionality request include a plurality of UI screens to receive user input for different aspects of the contest based functionality request.

19. A method for implementation by one or more data processors forming part of at least one computing system, the method comprising:
responsive to user inputs from a user to one or more user interface ("UI") element(s) on each of a plurality of displays rendered in a graphical user interface of a software application, initiating, by at least one data processor, a context based user request for functionality, wherein the UI element is a button, a pull-down menu, or a predetermined hot-key input,
providing, by at least one data processor, one or more UI input element(s) to receive inputs in the graphical user interface corresponding to the context based user request for functionality, wherein at least one UI input element is to receive textual inputs from the user;
capturing, by at least one data processor, contextual information corresponding to the software application based on the context based user request for functionality, wherein the contextual information includes operating information captured from the software application when the context based user request for functionality is initiated, the contextual information including a current display within the plurality of displays, a previous display within the plurality of displays, and data relating to the UI element; and
communicating, by at least one data processor, the context based user request for functionality and the captured contextual information to one or more developer(s) of the software application.

20. The method of claim 19, wherein the captured contextual information relates to a state of the software application at a point that the user initiates the functionality request, and capturing the contextual information from the software application includes:

analyzing the functionality request to determine whether the requested functionality or a functionality similar to the requested functionality exists within the software application, and suggesting the existing functionality to the user if the requested functionality or a similar functionality exists within the software application.

\* \* \* \* \*